US005343025A

United States Patent [19]

Usui

[11] Patent Number: 5,343,025

[45] Date of Patent: Aug. 30, 1994

[54] CHECK-OUT DEVICE WITH ACTIVITY SENSOR TERMINATING ARTICLE INPUT

[75] Inventor: Mitsuaki Usui, Shizuoka, Japan

[73] Assignee: Tokyo Electric Co., Ltd., Tokyo, Japan

[21] Appl. No.: 998,911

[22] Filed: Dec. 30, 1992

[30] Foreign Application Priority Data

Jan. 7, 1992 [JP] Japan .................................. 4-000491

[51] Int. Cl.[5] ........................ G06K 15/00; G06F 15/22

[52] U.S. Cl. ........................................ 235/383; 186/61

[58] Field of Search .................... 235/383, 462; 186/61

[56] References Cited

U.S. PATENT DOCUMENTS 4,387,297 6/1983 Swartz et al. ........................ 235/472
4,779,706 10/1988 Mergenthaler ...................... 235/383
4,787,467 11/1988 Johnson .............................. 235/383
4,939,355 7/1990 Rando et al. ......................... 235/462
4,964,053 10/1990 Humble ............................... 235/383

*Primary Examiner*—John Shepperd
*Attorney, Agent, or Firm*—Frishauf, Holtz, Goodman & Woodward

[57] ABSTRACT

A check-out device includes an input section having a customer operating panel, for sequentially inputting article codes of articles to be purchased, upon request from the customer operating panel, and a settlement section spaced away from the input section, for performing registration and settlement of the purchased articles according to the article codes input by the input section. The check-out device further includes a control section for causing the input section to terminate inputting of the articles in the case where a blank period during which no article code is input exceeds a preset time length.

11 Claims, 6 Drawing Sheets

CHECK-OUT DEVICE WITH ACTIVITY SENSOR TERMINATING ARTICLE INPUT

BACKGROUND OF THE INVENTION

1. Field of the Invention

The present invention relates to a check-out device for performing registration of purchased articles according to the article codes recorded thereon in a machine-readable form and, more particularly, to a check-out device wherein a customer participates in the process of inputting the article codes.

2. Description of the Related Art

A check-out device is installed in, for example, a supermarket as a self-service check-out counter. A customer puts articles he or she wants to purchase in a shopping cart, brings them to an input section of the check-out device, and depresses a start button on a customer operation panel of the input section so as to start registration of the articles. Thereafter, the customer lifts an article out of this cart, places it in front of an article code reader or a scanner of the input section in order for the article code affixed thereto to be input by means of a scanning operation performed by the scanner, and sets the read article on an entry conveyer provided above an electronic weigh scale. The scanner optically scans the article to read the article code thereof, and supplies the read article code to an electronic cash register spaced away from the input section. The electronic weigh scale measures the weight of the article set on the entry conveyer, and supplies a result of the measurement as measured weight data to the electronic cash register. The electronic cash register has an article data table containing article data of all the articles for sale, each of which is constituted by an article code, article name data, price data, and reference weight data, for example. The electronic cash register uses the read article data, the measured weight data, and the article data table to determine that the article whose article code is read by the scanner has definitely been set on the entry conveyer, and also uses the read article code to register the article as a purchased article after the determination. The article is conveyed from the entry conveyer to an outfeed conveyer after the determination, and then conveyed to a bagging area by means of the outfeed conveyor and an inclined chute. After scanning of all the articles to be purchased, the customer depresses a stop button on the operation panel to finish the article registration, at which time the electronic cash register performs settlement of the purchased articles with reference to the article data table. A cashier informs the customer of the total cost of the purchased articles obtained in the settlement, and stores the cash paid by the customer in a drawer of the cash register. After payment, the customer places the articles in the bagging area in a bag, and takes them away.

A process of the aforementioned determination is performed every time the electronic weigh scale measures the weight of an article. In this process, the cash register receives the measured weight data supplied from the electronic scale and data of the read article code supplied from the scanner, and checks whether the article code is correctly read or not. When it is correctly read, the measured weight data is compared with reference weight data of an article specified by the article code. If both the weight data coincide, the specified article is registered as a purchased article, using the read article code.

In the check-out device described above, the customer takes a task of inputting article codes of the purchased articles by means of the scanner, and the cashier takes a task of operating the cash register to process the input article codes. Therefore, the amount of time the customer is kept waiting without doing anything is shortened in comparison with the case where the cashier takes the task of inputting the article codes and the task of operating the cash register. The cashier's workload is reduced by the customer's cooperation. In addition, a use of the scanner prevents input errors such as occur in key operations for inputting the article codes. Thus, the problem of long queues of customers waiting at check-out counters is largely alleviated. Further, whether or not an article whose article code has been read and an article on the entry conveyor are the same, is checked by comparing the weight data, thereby preventing dishonesty by customers. Published Examined Japanese Patent Application No. 1-52794 discloses a device similar to the above-described check-out device.

However, the customer sometimes goes away from the input section of the check-out device to do something else for a while before finishing registration of all the articles to be purchased. In such a case, the cashier has to move to the input section to operate the stop button for the customer. If one cashier is in charge of a plurality of check-out lanes, the cashier's workload is increased in the movement to the input section.

SUMMARY OF THE INVENTION

It is an object of the present invention to provide a self-service check-out device which can be put in widespread use.

To attain the above object, there is provided a check-out device comprising: an input section having a customer operating panel, for sequentially inputting article codes of articles to be purchased, upon request from the customer operating panel; a settlement section spaced away from the input section, for performing registration and settlement of the purchased articles according to the article codes input by the input section; a control section for causing the input section to terminate inputting of the articles in the case where no article code is input for a preset period of time.

According to the check-out device, even if a customer goes away from the input section without finishing the input of all the article codes, the control section causes the input section to terminate inputting of the articles in the case where no article code is input for a preset period of time. Therefore, an operator of the settlement section does not have to move to the input section to operate the customer operating panel. This enables the self-service check-out device to be put in more widespread use.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

A check-out device according to one embodiment of the present invention will now be described, with reference to FIGS. 1 to 6.

This check-out device is used as a self-service check-out counter in a supermarket, for example.

Figure 1:
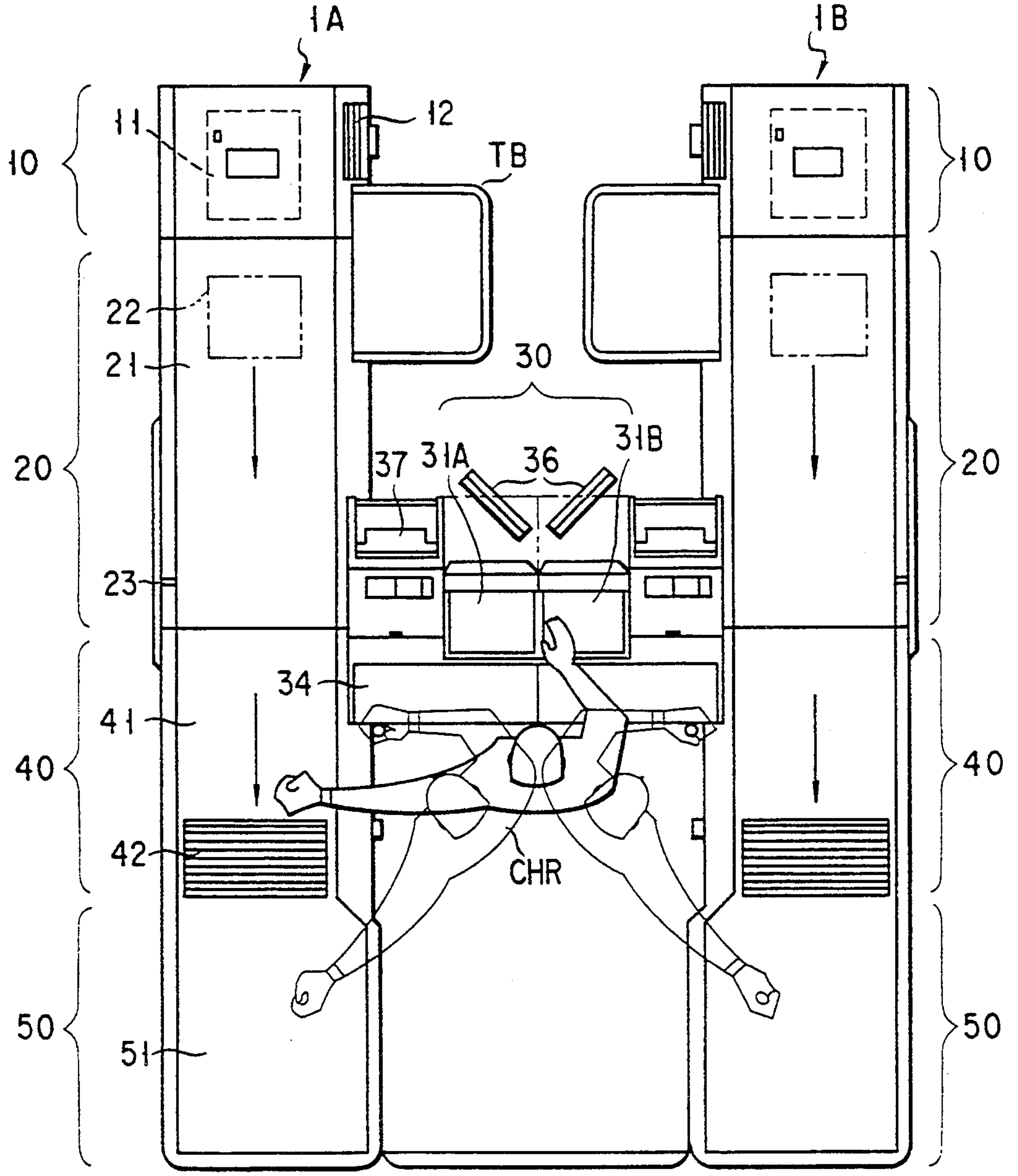
FIG. 1 is a top view of a check-out device used as a self-service check-out counter in a supermarket according to an embodiment of the present invention.

FIG. 1 is a top view showing the check-out device. The check-out device comprises a pair of check-out lanes 1A and 1B arranged in parallel. Each of the check-out lanes is constituted by an input section 10, an entry section 20, an outfeed section 40, and a stock section 50. The check-out device further comprises a settlement section 30 arranged between the check-out lanes 1A and 1B. The input section 10 includes a stationary scanner 11 for optically scanning an article to be purchased by a customer to read an article code recorded thereon in bar code form, an operation panel 12 to be used by the customer, a shelf TB for temporarily stocking articles the article codes of which the stationary scanner 11 has failed to read. The operation panel 12 includes a start button 15 for requesting start of article registration (or article code input), a stop button 16 for requesting end of the article registration, and a display for displaying a message to the customer. The scanner 11 is set in an operable state upon operation of the start button 15, and in a standby state upon operation of the stop button 16. The entry section 20 includes an entry conveyor 21 for conveying an article whose article code is read by the scanner 11, an electronic weigh scale 22 for measuring the weight of the article on the entry conveyor so as to produce measured weight data representing the result of measurement, and an article sensor 23 for optically sensing an article passing through an exit portion of the entry conveyor 21. The weight scale 22 is arranged below and in contact with an entrance portion of the entry conveyor 21. The article sensor 23 is arranged near the exit of the entry conveyor 21 and is constituted by a light-reflection type photosensor, for example. The outfeed section 40 includes an outfeed conveyor 41 for conveying an article coming from the entry conveyor 21, and an inclined chute 42 down which an article coming from the outfeed conveyor 41 slides to a bagging area 51 of a stock section 50. The settlement section 30 includes electronic cash registers 31A and 31B respectively arranged on the sides of the check-out lanes 1A and 1B and having the same construction. The cash register 31A is connected to the scanner 11 and the weigh scale 22 which are provided in the check-out lane 1A. The cash register 31B is connected to the scanner 11 and the weigh scale 22 which are provided in the check-out lane 1B. Both cash registers are operated by one cashier CHR. The settlement section 30 further includes first and second conveyor controllers 29, first and second foot switches 38, and first and second emergency switches 39. The first and second conveyor controllers 29 control article conveyance in the check-out lanes 1A and 1B, the first and second foot switches 38 are used to start the entry conveyors 21, and the first and second emergency switches 39 are used to stop the entry conveyors 21. The position of each of the switches 38 and 39 is determined for case of use by the cashier. The first conveyor controller 29 operates based on a control signal from the cash register 31A, and control signals from the article sensor 23, the foot switch 38, and the emergency switch 39 of the check-out lane 1A. The second conveyor controller 29 operates based on a control signal from the cash register 31B, and control signals from the article sensor 23, the foot switch 38, and the emergency switch 39 of the check-out lane 1B. In each of the check-out lanes 1A and 1B, internal motors of the conveyors 21 and 41 are started and stopped by a corresponding conveyor controller 29. Normally, the entry conveyor 21 starts when an article whose code is read by the scanner 11 is identified as that set on the conveyor 21, and stops when the article passes the article sensor 23. On the other hand, the outfeed conveyor 41 starts when the scanner 11 is set in the operable state, and stops when the scanner 11 is set in the standby state.

The check-out procedure will be briefly described hereinafter.

Articles to be purchased are placed in a shopping cart and carried to a desired check-out lane 1A, for example. The customer depresses a start button 15 on an operation panel 12 in order to start registration of all the articles. Thereafter, the customer picks up an article from the cart, and places it in front of the scanner 11 in order to input the article code affixed thereto, and then sets the scanned article on the entry conveyor 21 provided over an electronic weigh scale 22. When the scanner 11 has optically scanned the article to read the article code thereof, it supplies the read article code to the electronic cash register 31A. The electronic weigh scale 22 measures the weight of the article set on the entry conveyor 21, and supplies the measurement result as measured weight data to the cash register 31A. After receiving the read article code and the measured weight data, the cash register 31A determines whether the article whose article code is read and that set on the entry conveyor 21 are the same, and registers the article as a purchased article by use of the read article code. The article is then moved to the bagging area 51 by the entry conveyor 21, the outfeed conveyor 41, and inclined chute 42. After scanning of all articles to be purchased, the customer depresses a stop button to finish the article registration. The cashier operates the cash register 31 to perform settlement in respect of the purchased articles registered therein, informs the customer of the total cost of the purchased articles, and stores the cash paid by the customer in the drawer of the cash register 31. After payment, the customer places the articles stocked in bagging area 51 in a bag, and takes them away.

During the article registration and settlement described above, each of the electronic cash registers 31A and 31B controls the conveyor controller 29, the weigh scale 22, the scanner 11, and the operation panel 12. The construction of the electronic cash register 31A will now be described in more detail. A description of the cash register 31B is omitted, since it has the same construction as the cash register 31A.

Figure 2:
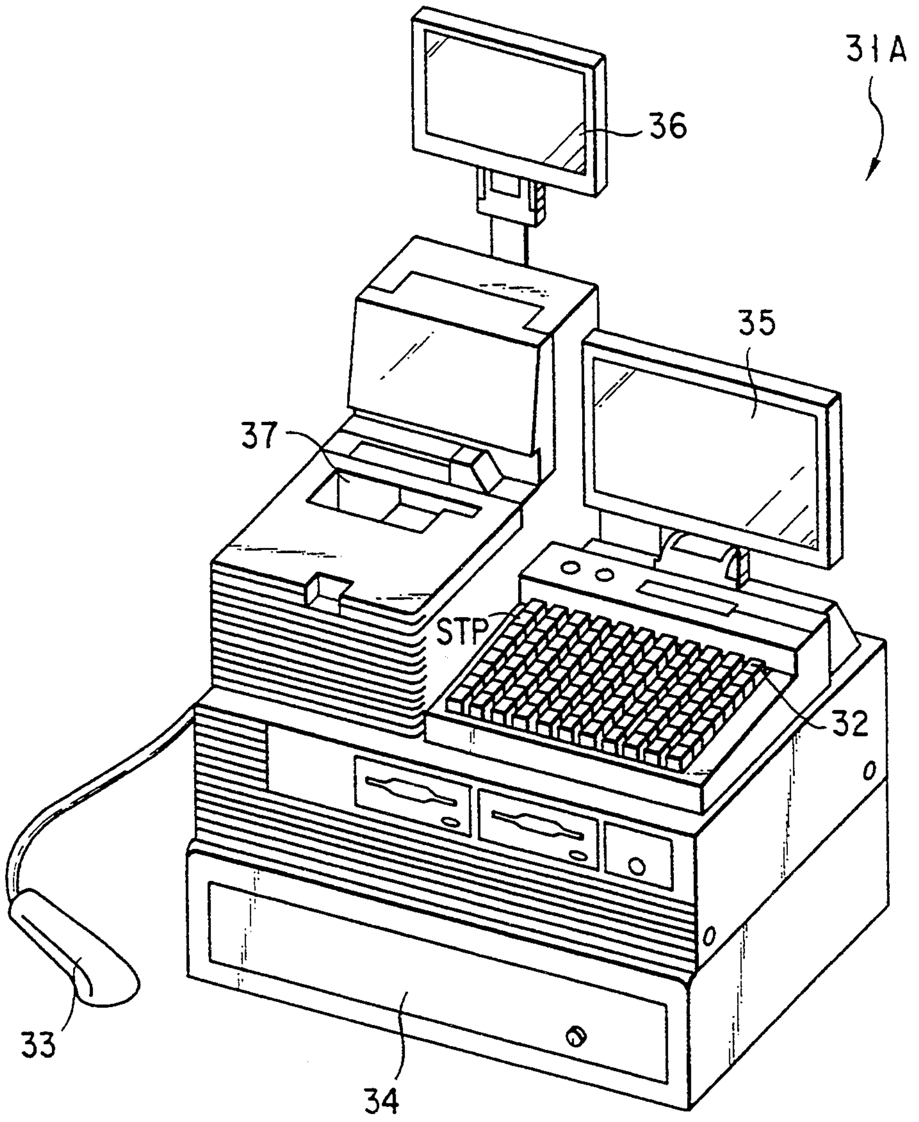
FIG. 2 is a perspective view of a cash register shown in FIG. 1.

As shown in FIG. 2, the electronic cash register 31A comprises a keyboard 32, a handy scanner 33, a drawer 34, an operator display 35, a customer display 36, and a printer 37. The keyboard 32 and the handy scanner 33 are used by the cashier to input an article code which the scanner 11 has been failed to read. The keyboard 32 includes a ten-key pad, a close key, a cancel key, a discount key, a stop key STP, and the like. The stop key STP is provided in order to interrupt the article registration started by the customer. The scanner 11 is changed from the operable state to the standby state upon operation of the stop key STP. The displays 35 and 36 display article data of each purchased article and the total sales amount. The drawer 34 stores the cash paid by the customer. The printer 37 issues a receipt on which purchased article names, sales prices, total sales amount, and the like are printed.

Figure 3:
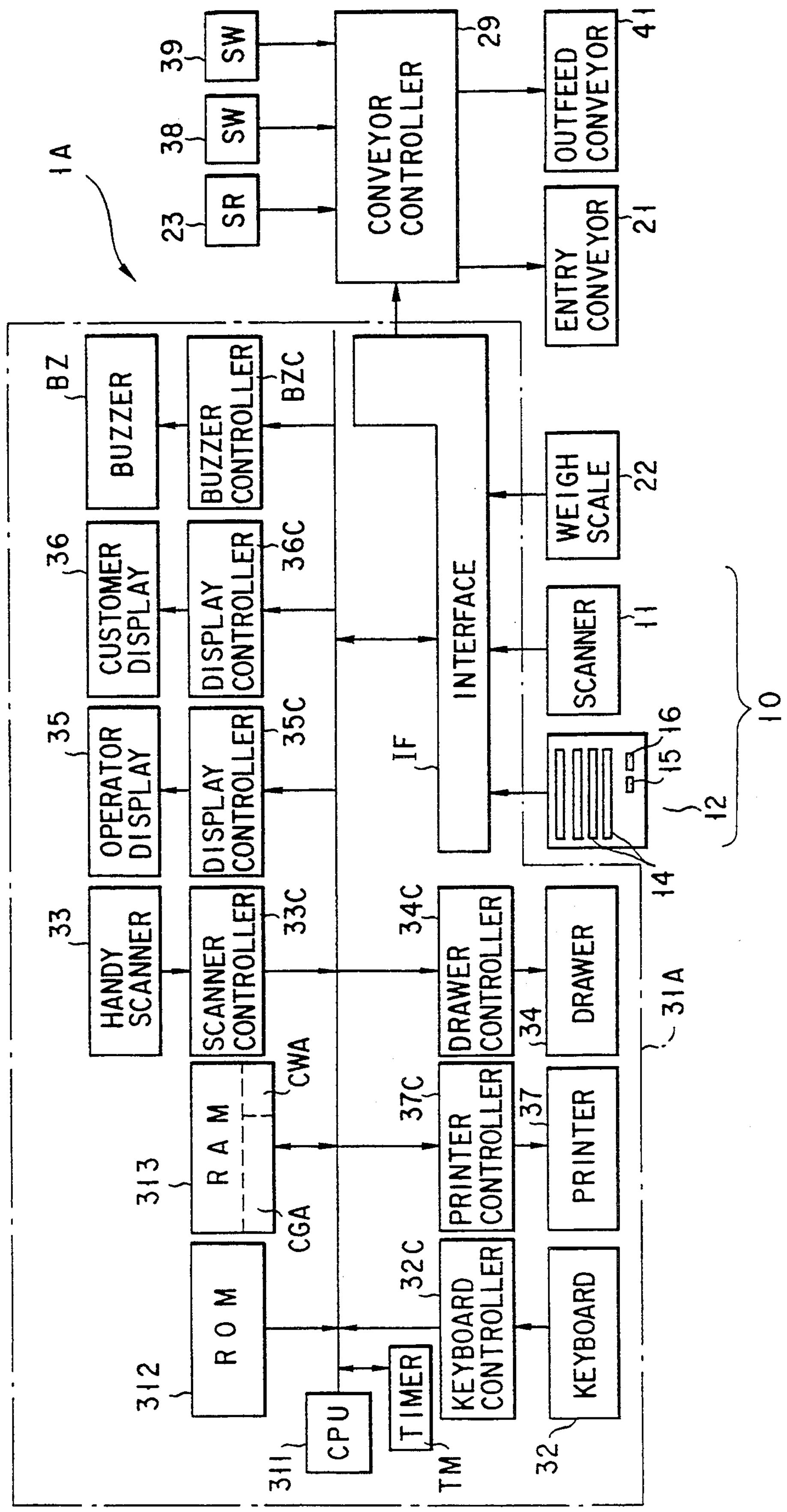
FIG. 3 is a block diagram showing a control circuit of the check-out device shown in FIG. 1.

The electronic cash register 31A further comprises a CPU 311, a ROM 312, a RAM 313, an interface IF, a keyboard controller 32C, a scanner controller 33C, a drawer controller 34C, display controllers 35C and 36C, a printer controller 37C, a buzzer controller BZC, and a timer TM which are interconnected by means of a bus line as shown in FIG. 3. The CPU 311 performs various data processings to control all operations performed by the cash register 31A and check-out lane 1A. The cash register 31A is operable in one of a setting mode, a registration mode, an inspection mode, and a settlement mode under the control of the CPU 311. A process of the aforementioned article registration and settlement is performed when the registration mode is selected. The CPU 311 is connected to the keyboard 32, the handy scanner 33, the drawer 34, the operator display 35, the customer display 36, the printer 37, and a buzzer BZ via the controllers 32C to 37C and the buzzer controller BZC, respectively. The CPU 311 is further connected to the operation panel 12, the scanner 11, the weigh scale 22, and the conveyor controller 29 via the interface IF. The interface IF includes a circuit enabling data transfer to and from each of a magnetic disk driver and an external computer (not shown). The ROM 312 stores a control program for the CPU 311, and fixed data such as printing fonts, display fonts, and the like. The RAM 313 stores various data input to and output from the CPU 311. More specifically, the RAM 313 has a storage area CGA for storing an article data table which contains article data of all articles for sale, and a storage area CWA for storing work data such as a read article code, measured weight data, and article data of an article specified by the read article code. Each article data includes items of data representing the article code, the article name, unit price, and reference weight. The article data table is accessed from the external computer or the magnetic disk driver, and set in the storage area CGA of the RAM 313. Additionally, the RAM 313 stores data of a preset time length T0 as an allowable maximum length of a blank period BLK (or time interval) during which no article code is input from the scanner 11. The CPU 311 controls the timer TM in order to detect that the blank period BLK exceeds the preset time length T0. More specifically, the CPU 311 starts the timer TM upon operation of the start button 15 and upon input of an article code from the scanner 11. The timer TM measures time elapsed from its starting and produces output data representing the elapsed time. This output data is cleared when the timer TM is stopped. The CPU 311 drives the buzzer BZ when it is detected from the output data of the timer TM that the blank period BLK exceeds the preset time length T0.

The cashier is informed by the buzzer BZ that the input of article codes has been intermitted for a period exceeding the preset time length T0, and decides whether to interrupt the article registration. The stop key STP of the keyboard 32 is operated when the article registration is decided to be interrupted.

Figure 4:
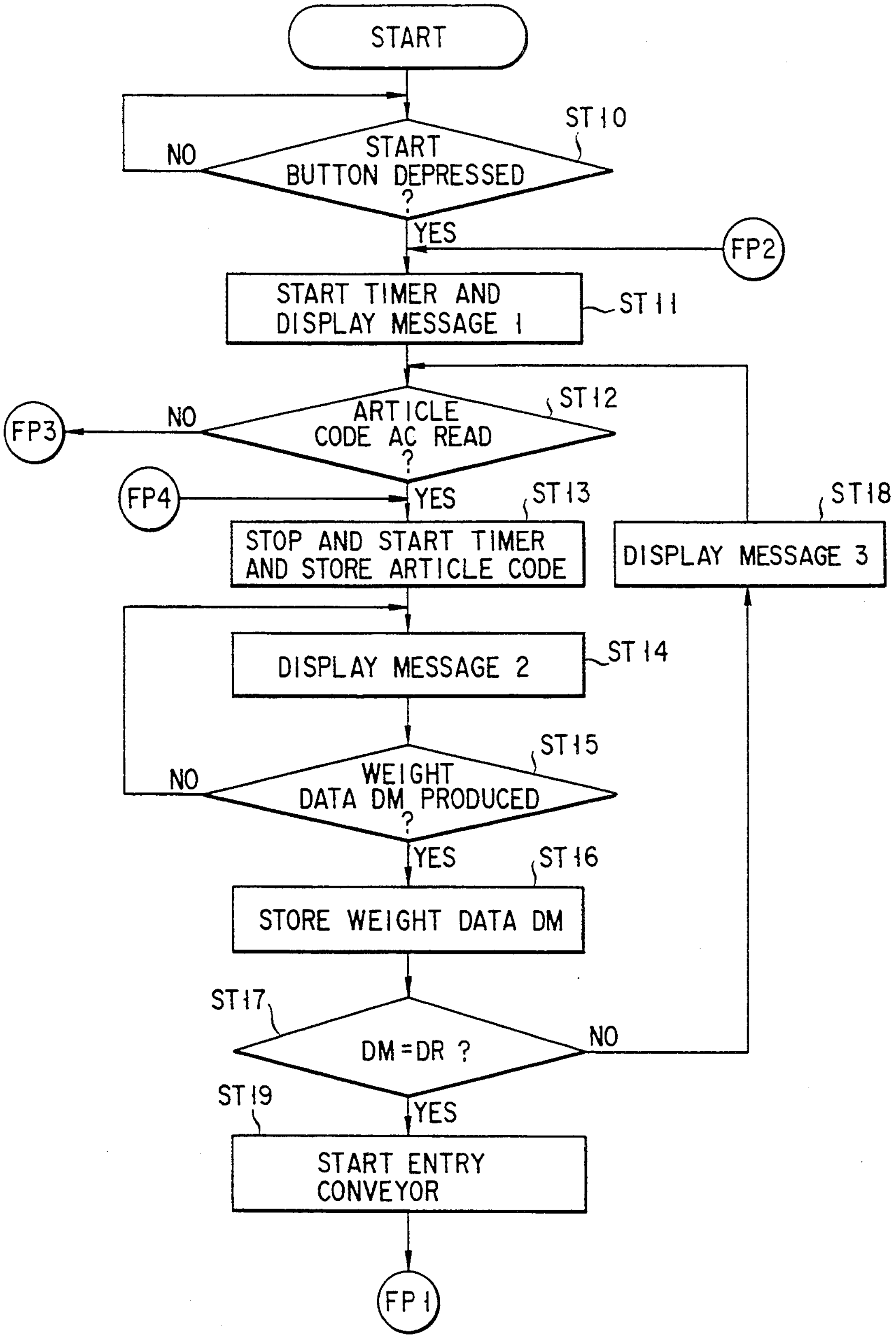
FIGS. 4 to 6 are flowcharts for explaining the operation of the control circuit shown in FIG. 3.
Figure 5:
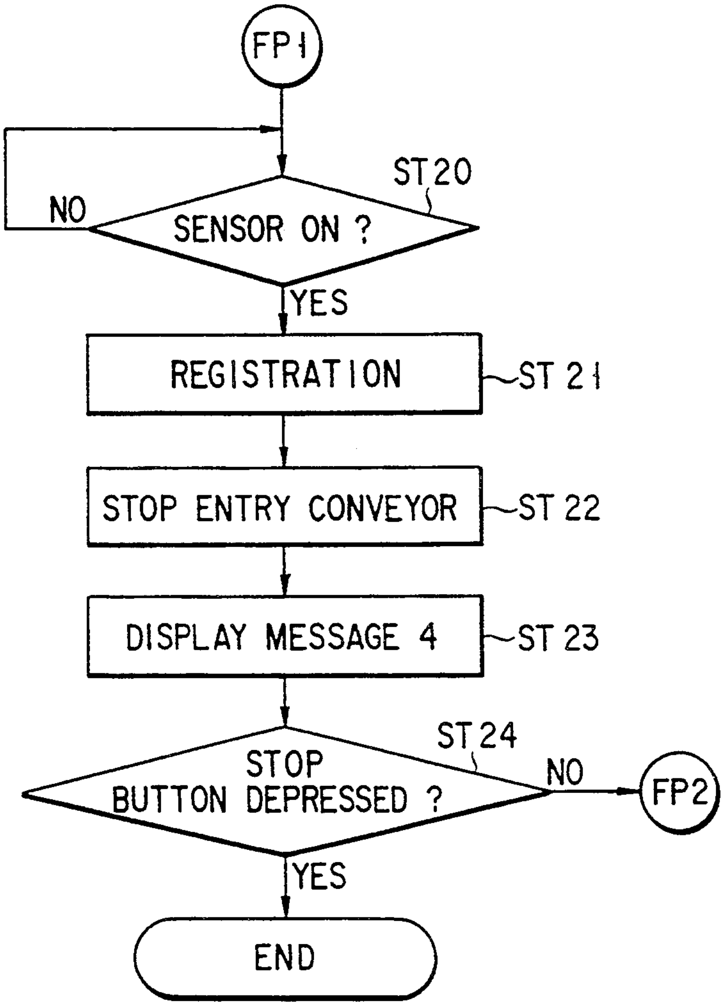
Figure 6:
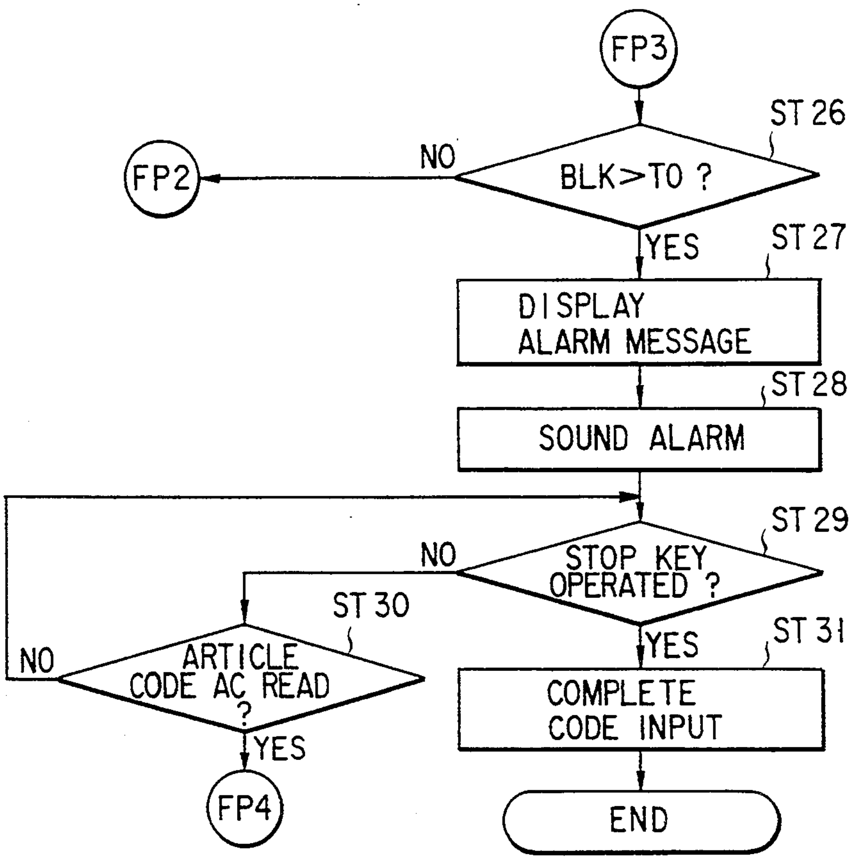

The operation of the check-out device will now be described, with reference to FIGS. 4 to 6. FIGS. 4 to 6 are flowcharts showing a process of registering articles to be purchased.

A customer who has placed in a cart articles he or she wishes to purchase comes to the input section 10 of the check-out lane 1A, and depresses the start button 15. When the button 15 is detected to be depressed in step ST10, the CPU 311 starts the timer TM and causes the display 14 to display a message 1 "PLEASE SCAN ARTICLE" in step ST11. When the customer places an article in front of the scanner 11, an article code AC of the article is read by the scanner 11, and supplied to the cash register 31.

The fact that the article code has been correctly read by the scanner 11 is confirmed in step ST12, the CPU 311 stops the timer TM and starts it again in step ST13, and then stores the article code AC read by the scanner 11 in the storage area CWA of the RAM 313. At this time, article data corresponding to the article code AC is extracted from the article data table stored in the storage area CGA of the RAM 313, and stored temporarily in the storage area CWA. In step ST14, the display 14 displays a message 2 "PLEASE SET THIS ARTICLE ON ENTRY CONVEYOR." The weigh scale 22 measures the weight of the article set on the entry conveyor 21, and supplies the measurement result as measured weight data DM to the electronic cash register 31A. When it is detected in step ST15 that the measured weight data DM has been obtained, the weight data DM is temporarily stored in the storage area CWA of the RAM 313. In step ST17, the measured weight data DM is compared with the reference weight data DR contained in the article data stored in the storage area CWA. If it is detected that DM is close to DR, the CPU 311 identifies the article whose article code has been read as being the article set on the entry conveyor 21, and in step ST17 supplies a drive instruction to the conveyor controller 29 so as to start the entry conveyor 21.

If it is detected that DM is not close to DR, the CPU 311 causes the display 14 to display a message 3 "PLEASE REMOVE THIS ARTICLE FROM ENTRY CONVEYOR AND SCAN IT AGAIN" in step ST18. In this case, the entry conveyor 21 remains stopped, and the step ST12 is executed again.

If it is determined that the article whose article code is read is the same as the article set on the entry conveyor 21, the entry conveyor 21 conveys the article towards the outfeed conveyor 41. In step ST20 shown in FIG. 5, it is checked whether the sensor 23 has sensed the article so conveyed. If the article has been sensed, the CPU 311 registers the article by using the read article code in step ST21. In step ST22, the CPU 311 controls the conveyor controller 29 to stop the entry conveyor 21. In step ST23, the CPU 311 causes the display 14 to display a message 4 "PLEASE SCAN THE NEXT ARTICLE OR DEPRESS STOP BUTTON."

The process described above is repeated until the article codes of all articles have been input, after which the stop button 16 is depressed. When operation of the stop button 16 is detected in step ST24, the CPU 311 returns the scanner 11 to the standby state to finish inputting the article codes.

The registration of all the articles to be purchased is completed accordingly. The cashier confirms that the customer moves from the input section 10 toward the settlement section 30, and operates the keyboard 32 to request settlement of the registered articles. In this settlement, the CPU 311 calculates sales data such as the number of purchased articles and the total sales amount on the basis of article data of the registered articles, and causes the sales data to be displayed in the display 36 of the cash register 31. The customer pays the cashier the total sales amount displayed on the display 36. If the shelf TB has articles placed thereon due to failure of the scanner 11 to read the article code thereon, the customer takes the articles to the settlement section 30 and gives them to the cashier. The cashier then inputs their article codes by way of the keyboard 32 or the scanner 33. After payment, the customer bags the articles stocked in the bagging area 51.

The steps ST12 and ST26 are repeated in the case where no article code is read by the scanner 11. If absence of a read article code is confirmed in step ST12, the CPU 311 checks output data of the timer TM to determine whether the blank period BLK exceeds the preset time length T0 in step ST26. If not, the step ST12 is executed again.

When it is detected that the blank period BLK exceeds the preset time length T0, the CPU 311 controls the display 35 to display a warning message for informing the cashier of this detection in step ST27, and the buzzer BZ to raise an alarm in step ST28. After that, the CPU 311 repeatedly executes steps ST29 and ST30 until either the stop key STP is operated or an article code is read. When it is detected in step ST30 that an article code is read, the step ST13 is executed to continue the operation of the scanner 11. When it is detected in step ST29 that the stop key STP is operated, the CPU 311 returns the scanner 11 to the standby state to terminate its operation in step ST31. At this time, the article registration is interrupted even if some of the articles to be purchased remain unregistered. The article data of the registered articles are maintained in the RAM 313 as being suspended from the settlement.

According to the check-out device described above, the timer TM measures time elapsed after its starting, and the CPU 311 detects from the output data of the timer TM that the blank period BLK exceeds the preset time length T0. The CPU 311 thus drives the display 35 and buzzer BZ to inform the cashier that no article code is input for a period longer than the preset time length T0. When the cashier depresses the stop key STP, the input of the article codes is forced to terminate. For example, when a customer goes away from the input section 10 to do something else for a while before he or she depresses the stop button 16, or when a customer unfamiliar to the check-out device fails to depress the stop button 16 after the codes of all the purchased articles are read and input, the cashier can deal with such a situation with his or her eyes. Since, in this case, the cashier does not have to move to the input section 10 in order to depress the stop button 16, the workload of the cashier is decreased. If the customer tells the cashier that he or she goes away from the input section 10 and returns thereto soon, the cashier can be prevented from depressing the stop key STP after a warning of the buzzer BZ. If the customer returns to the input section 10 before the stop key STP is depressed, the input of the article codes can be continued.

Figure 7:
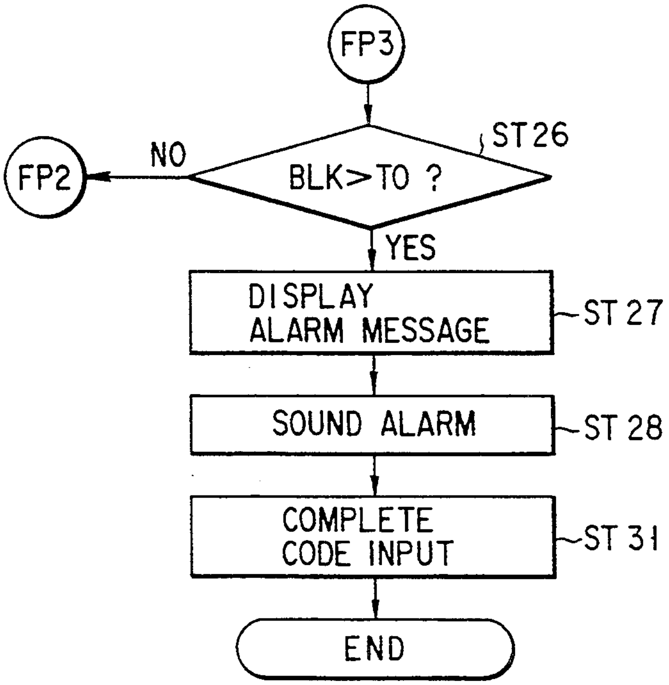
FIG. 7 is a flowchart for explaining the operation of a modification to the control circuit shown in FIG. 3.

In the above embodiment, when it is detected that the blank period BLK exceeds the preset time length T0, the CPU 311 repeats the steps ST28 and ST29 after the step ST27 until the stop key STP is operated or an article code is read. However, as shown in FIG. 7, the steps ST28 and ST29 can be eliminated in accordance with the type of sales to execute the step ST30 after the step ST27. The input of the article codes is terminated directly after the cashier is informed that no article code is input for a period longer than the preset time length T0. Consequently, the wait for check-out can be shortened, and the next customer can start article registration quickly.

In the above embodiment, the timer TM only measures the blank period BLK. However, it can be designed to detect that the blank period BLK exceeds the preset time length T0, and produce an output signal representing the detection.

Further, the weigh scale 22 can be replaced by another weigh scale which is vertically movable under the entrance portion of the entry conveyor 21. In this case, the weigh scale is is set at a lower position when the entry conveyor 21 is being operated, and at an upper position when the conveyor 21 is not being operated. The weight of an article is measured in the state where the weigh scale is at the upper position and in contact with the entry conveyor 21.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A check-out device comprising:

input means, having a customer operating panel, for performing an input operation of sequentially inputting article codes of articles to be purchased, a start and a termination of the input operation being controlled by the customer operating panel;

settlement means spaced apart from said input means, for performing a registration and a settlement of the articles to be purchased according to the article codes input for each input operation performed by said input means; and control means for controlling a termination of said input operation in place of said customer operating panel, said control means being enabled after a blank time period, during which no article code is input from said input means, exceeds a preset time period.

2. The check-out device according to claim 1, wherein said control means includes:

timer means for measuring a blank time period during which no article code is input from said input means; and processing means for checking whether the blank time period measured by said timer means exceeds the preset time period.

3. The check-out device according to claim 2, wherein said control means further includes signal means for producing an alarm signal when it is detected by the processing means that the measured blank time period exceeds the present time period.

4. The check-out device according to claim 3, wherein said processing means includes:

a control key;

means for detecting an operation of the control key performed after the measured blank time period exceeds the present time period; and means for causing said input means to terminate the input operation, upon detection of the control key operation.

5. The check-out device according to claim 4, wherein said control key is located at said settlement means.

6. The check-out device according to claim 2, wherein said processing means includes means for causing said input means to terminate the input operation upon detection of the measured blank time period exceeding the preset time period.

7. The check-out device according to claim 2, wherein said processing means includes:

a control key;

means for detecting an operation of the control key performed after the measured blank time period exceeds the preset time period; and means for causing said input means to terminate the input operation, upon detection of the control key operation.

8. The check-out device according to claim 7, wherein said control key is located at said settlement means.

9. The check-out device according to claim 3, wherein said processing means includes means for causing said input means to terminate the input operation upon detection of the measured blank time period exceeding the preset time period.

10. The check-out device according to claim 1, wherein said control means is incorporated into said settlement means.

11. The check-out device according to claim 1, wherein said input means includes an article code reader for sequentially reading article codes of the articles to be purchased.

* * * * *